(12) United States Patent
Hofmann

(10) Patent No.: US 11,612,833 B2
(45) Date of Patent: Mar. 28, 2023

(54) CHROMATOGRAPHY SYSTEM WITH TILT-PREVENTION STRUCTURE AND ASSOCIATED PROCESS

(71) Applicant: Biotechflow Ltd, Stroud (GB)

(72) Inventor: Martin John Hofmann, Stroud (GB)

(73) Assignee: Biotechflow Ltd, Stroud (GB)

( * ) Notice: Subject to any disclaimer, the term of this patent is extended or adjusted under 35 U.S.C. 154(b) by 0 days.

(21) Appl. No.: 17/512,805

(22) Filed: Oct. 28, 2021

(65) Prior Publication Data

US 2022/0143529 A1    May 12, 2022

Related U.S. Application Data

(63) Continuation of application No. 16/441,234, filed on Jun. 14, 2019, now Pat. No. 11,253,795, which is a (Continued)

(30) Foreign Application Priority Data

Feb. 15, 2013  (GB) ..................... 1302714

(51) Int. Cl.
*B01D 15/22* (2006.01)
*B01D 15/18* (2006.01)
(Continued)

(52) U.S. Cl.
CPC ......... *B01D 15/22* (2013.01); *B01D 15/1807* (2013.01); *G01N 30/6021* (2013.01); (Continued)

(58) Field of Classification Search
CPC .. B01D 15/22; B01D 15/1807; B01D 15/206; G01N 30/6021; G01N 30/6026; G01N 30/56; G01N 30/58; G01N 30/603
See application file for complete search history.

(56) References Cited

U.S. PATENT DOCUMENTS

| 3,510,271 A | 5/1970 | Emneus et al. |
| 4,549,584 A | 10/1985 | Morin et al. |

(Continued)

FOREIGN PATENT DOCUMENTS

| WO | WO 03/046546 A1 | 6/2003 |
| WO | WO 2009/093952 A1 | 7/2009 |

OTHER PUBLICATIONS

Chromatography Bio-Rad GelTec Process Chromatography Columns, Bio-Rad Laboratories, Inc. 2007, Bulletin 3129.

(Continued)

*Primary Examiner* — Benjamin L Lebron
(74) *Attorney, Agent, or Firm* — Woodard Emhardt Henry Reeves & Wagner LLP

(57) ABSTRACT

Chromatography apparatus and methods are described, especially for expanded bed adsorption. A column tube has a process fluid input device at the bottom and a movable piston in the top. The piston is enclosed in the column by a cover plate. The piston body has an inflatable seal, and is connected by a frame to a contact ring which carries another inflatable member to contact the tube wall. Process fluid leaves the operating volume through an opening of the piston and flexible hose, through the enclosed space and out through the cover plate. The space above the piston can be pressurised to control piston movement. The contact ring maintains piston alignment. The inflatable seals are used to fix the piston in position, allow it to slide or allow washing. The piston outlet may include a vortex-inhibitor. Bed and piston levels may be monitored by ultrasound sensors.

13 Claims, 7 Drawing Sheets

Related U.S. Application Data continuation of application No. 14/825,198, filed on Aug. 13, 2015, now abandoned, which is a continuation of application No. PCT/GB2014/050456, filed on Feb. 17, 2014.

(51) Int. Cl.

| | | |
|---|---|---|
| *G01N 30/60* | (2006.01) | |
| *G01N 30/58* | (2006.01) | |
| *B01D 15/20* | (2006.01) | |
| *G01N 30/56* | (2006.01) | |

(52) U.S. Cl.
CPC ....... *G01N 30/6026* (2013.01); *B01D 15/206* (2013.01); *G01N 30/56* (2013.01); *G01N 30/58* (2013.01); *G01N 30/603* (2013.01)

(56) References Cited

U.S. PATENT DOCUMENTS

| | | | |
|---|---|---|---|
| 4,891,133 A | 1/1990 | Colvin, Jr. | |
| 4,971,688 A | 11/1990 | Francois et al. | |
| 5,141,635 A | 8/1992 | LeBlang et al. | |
| 5,169,522 A | 12/1992 | Shalon | |
| 5,366,621 A | 1/1994 | Bidell et al. | |
| 5,486,289 A | 1/1996 | McCullough | |
| 5,866,008 A | 2/1999 | Shalon et al. | |
| 5,893,971 A | 4/1999 | Shalon et al. | |
| 5,902,485 A | 5/1999 | Davies | |
| 6,036,855 A | 3/2000 | Shalon et al. | |
| 6,139,732 A | 10/2000 | Pelletier | |
| 6,620,326 B1 * | 9/2003 | Lihme ................ | B01D 15/1807 210/656 |
| 7,972,506 B2 | 7/2011 | Hoffmann | |
| 2003/0102266 A1 | 6/2003 | Ritacco | |
| 2007/0193933 A1 | 8/2007 | Vidalinc | |
| 2008/0264837 A1 | 10/2008 | Agee | |
| 2009/0184052 A1 | 7/2009 | Agren | |
| 2010/0084344 A1 * | 4/2010 | Lihme ..................... | C07K 1/22 210/656 |

OTHER PUBLICATIONS

EasyPack and GelTec Process Chromatography Columns, Bio-Rad Laboratories leaflet.
PCT/GB2014/050456 International Search Report and Written Opinion dated Jun. 3, 2014.

* cited by examiner

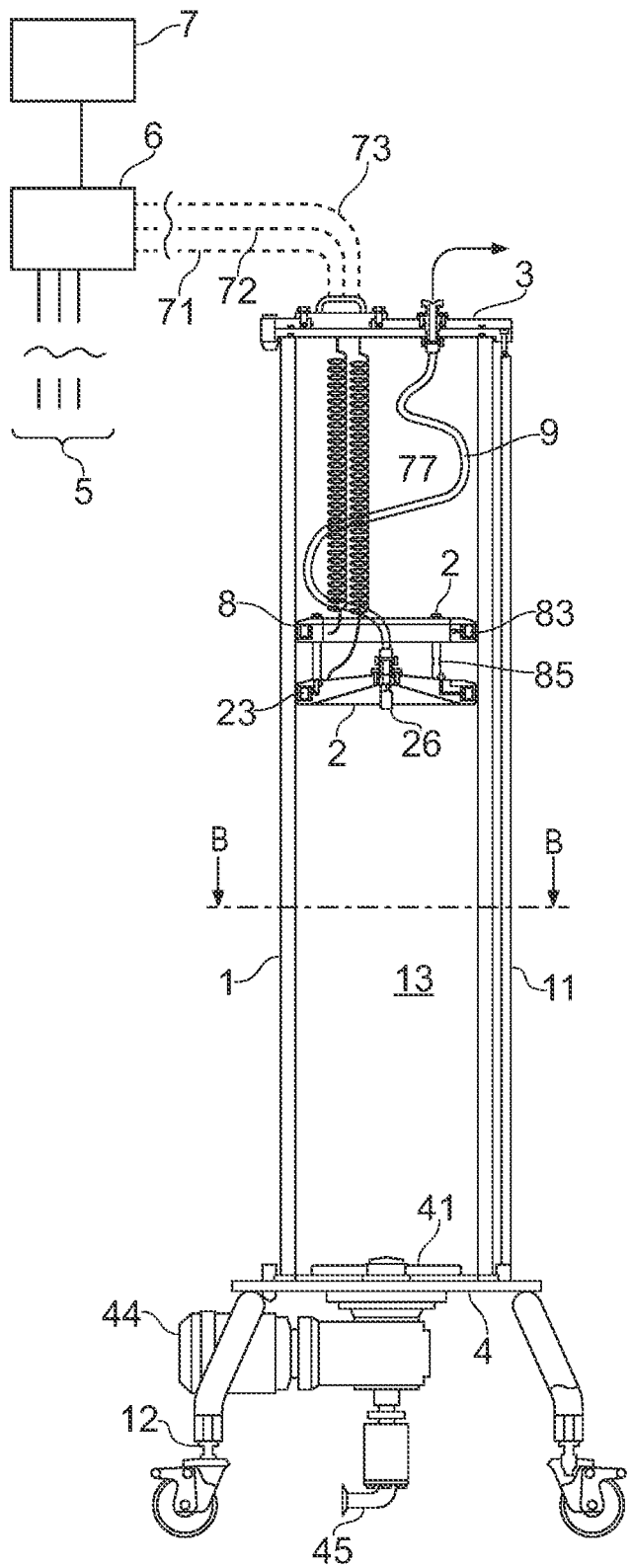
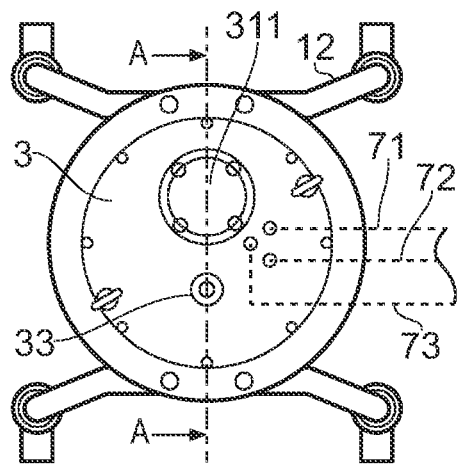
FIG. 2
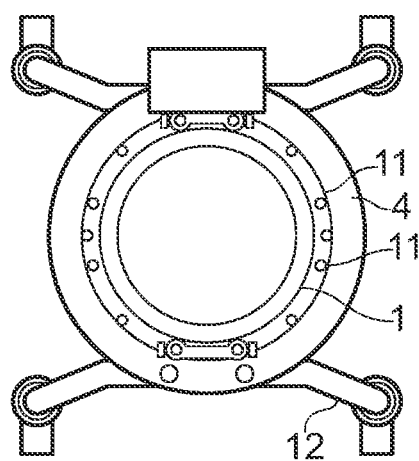
FIG. 3
FIG. 1

CHROMATOGRAPHY SYSTEM WITH TILT-PREVENTION STRUCTURE AND ASSOCIATED PROCESS

CROSS-REFERENCE TO RELATED APPLICATIONS

This application is a continuation of U.S. patent application Ser. No. 16/441,234 filed Jun. 14, 2019, which is a continuation of U.S. patent application Ser. No. 14/825,198 filed Aug. 13, 2015, which is a continuation of PCT/GB2014/050456 filed Feb. 17, 2014, which claims priority to GB1302714.9 filed Feb. 15, 2013, all of which are hereby incorporated by reference.

BACKGROUND

This invention has to do with apparatus, systems and processes for chromatography. Aspects of the invention have particular relevance for expanded bed (fluidised bed) processes. These are processes in which a process liquid is contacted with a bed of solid particulate medium in a column, by passing the liquid through the column. Contact with the solid medium allows treatment of the liquid, in most cases the treatment constituting or comprising separation of a component of the process liquid by retention thereof on the medium.

Chromatography has traditionally used packed beds of particulate medium, retained between end retaining structures of the column tube which keep the bed of medium in place while allowing passage of the liquid components. The end retaining structures (sometimes called "cells") have a mesh through which liquid but not media particles can pass. The cells may be fixed to the column tube, or one or both of them may be operationally slidable within it, with a piston seal, for adjustment of bed height.

In recent years the industrial-scale production of biologically-produced molecules, e.g. for drugs, vaccines or diagnostic agents, has become of great technical and economic importance. Many such products are produced in cell cultures and they (or their precursors) must be separated from a culture product (e.g. homogenised broth or slurry) which typically contains insoluble solids such as cell debris as well as contaminants; it cannot be passed as mobile phase through a packed bed to adsorb the product chromatographically (preparative chromatography) because the solids would block the system. Rather, the culture product must first be processed to remove the solid matter and make a process liquid able to pass through stationary phase beds.

Expanded Bed Adsorption (EBA) enables separation of target components from such process liquids without preliminary centrifugation or filtration. In EBA the process liquid runs up through a bed of adsorbent medium particles in expanded (fluidised) state. Solid material in the process liquid passes up right through the bed to the outlet; the inlet and outlet are without meshes. Target product is adsorbed onto the particulate medium and is subsequently eluted (washed) from it, either downwardly with the bed packed or upwardly with the bed fluidised.

EBA therefore offers important efficiencies. For example, because it can directly process liquids containing high proportions of solids or of target substance, such as high cell density broths from a bioreactor, it enables the high productivity of such bioreactor processes to be carried through the later processing.

However EBA also presents major technical challenges. It is difficult to maintain the expanded bed in a stable and effective state, e.g. maintaining the vertical gradation of reducing particle size, and avoiding direct channeling of process liquid through the bed.

Measures taken to control bed behaviour include special process liquid injection arrangements at the bottom of the column, to produce plug-like flow e.g. by injecting the liquid through an array of holes distributed over the bottom cell, optionally stirring with a rotating stirrer. Or, an array of process liquid injection holes is in a motor-driven distribution rotor. At the top of the bed a movable piston or float may lie on the liquid surface to mount the process liquid outlet, or the outlet tube may simply dip into the clear liquid ("headspace" or supernatant) above the particle bed.

EBA columns are relatively tall, because of the bed expansion. Expanded bed height—which may be about twice the rest height—is controlled by adjustment of the liquid flow rate, optionally in conjunction with a top piston or float as mentioned. Top pistons are problematic because the mounting and control structure connecting them through the end of the column (usually a pipe incorporating the outlet conduit and/or guide rods) needs large vertical clearance.

Solids passing through the column may accumulate and foul the apparatus—cell materials are often sticky—which is then difficult to disassemble for cleaning. As the apparatus is scaled up, bed diameter increases, components become larger and heavier and serious operational difficulties may arise.

As a consequence of these various technical challenges, scale-up of EBA for industrial application has scarcely progressed despite the intrinsic merits of the EBA method in itself.

SUMMARY

We propose new kinds of chromatography apparatus and chromatography processes with a view to enhancing and facilitating the operation of apparatus and processes of the kind described, especially but not exclusively EBA. One particular aspect addressed is construction, operation and control of a movable end cell or piston.

Particular advantages are envisaged for scale-up of EBA and also other movable-cell apparatus and methods General Context The apparatus aspects of the invention relate in general to chromatography apparatus comprising a column tube and first and second end retainer structures (end cells) which close off the column tube at respective axially-spaced first and second positions to define between them an operating volume which in use contains a stationary phase material, typically a bed of particles. The apparatus has first and second process fluid conduits communicating into the operating volume at the first and second positions, preferably through the end cells, for liquid e.g process fluid or mobile phase liquid such as buffer (equilibration, elution, wash) to enter and leave the operating volume in use.

Movable Piston Proposals

In a first aspect, at least one of the end cells is a movable piston, slidably axially movable inside the tube over a range of operational positions and comprising a peripheral fluid-tight operating seal which seals against the inside of the column tube in operation to prevent the passage of liquid. It may be the top cell of an upright column.

One proposal in this aspect is that the piston comprises a piston body, which mounts or comprises the operating seal and closes off the tube (except for any said process fluid conduit therein, which is desirably present, preferably at the centre) and additionally a tilt-prevention structure, connected to and rigidly axially-aligned with the piston body, the tilt-prevention structure having a circumferentially-distributed contact structure which engages around the interior of the column tube at an axial spacing from the operating seal to maintain axial alignment of the piston in the column tube. The contact structure may slide against the tube interior surface.

Preferred features of the piston are as follows, which (insofar as they are compatible) are desirably combined.

The contact structure may be annular and engage continuously around the tube interior. If however it has plural circumferentially-spaced contact elements these are preferably spaced by angular circumferential gaps not more than 90°, preferably not more than 70°, more preferably not more than 45° or not more than 30°, to assure adequate tilt-prevention. It may be non-metallic, e.g. polymeric or elastomeric. It may be an elastomeric ring, although it does not have a sealing function. The contact structure may be radially movable in the tilt-prevention structure and the piston may comprise a contact structure actuating mechanism such as a pneumatically-actuated mechanism for urging the contact structure radially outwardly against the tube interior and/or for retracting it to a radially retracted condition or position. A preferred contact structure is or comprises an elastomeric ring, e.g. a hollow ring, with a pneumatically-actuated mechanism for urging it outwards. A pneumatic gas line may connect between this mechanism and the exterior of the apparatus, e.g. out through an end of the tube, such as through an end plate or cover.

Desirably the contact structure of the tilt-prevention structure and the operating seal are the only piston parts engaging the column, so that the piston can travel along the column without tilting or jamming, without having a rigid connection (such as the axial piston rod pipes or guide rods of the prior art) engaging (passing) through a fixed column end structure of the apparatus. That is, the piston may be entirely inside the column tube, and be self-aligning with the column tube axis by its axially-distributed engagements with the column wall.

The engaged locus of the contact structure may be at a constant axial spacing from the operating seal, around the tube. Preferably it contacts the tube interior at a single annular locus spaced from the operating seal (e.g. a circle parallel to that of the seal), contacting either continuously or intermittently around the circle.

Preferably the tilt-prevention (or stabilising) structure does not contact the column wall between the operating seal and the contact structure. Desirably the tilt-prevention structure is open, in the sense that the column wall behind the operating seal, i.e. between the operating seal and the contact structure, is open or exposed to the column tube interior space behind the piston (i.e. outside the operating volume). This can facilitate access and cleaning. Of course in principle however tilt-prevention may be provided simply by sufficient axial length of a piston body.

The tilt-prevention structure may comprise an open frame e.g. comprising or consisting of rods, legs or struts with intervening spacing. The frame can connect an annular body supporting the operating seal to the contact structure, which may itself be, comprise or be mounted on an annular body.

Alternatively, if the contact structure has plural circumferentially-spaced contact elements these may be provided on respective axially projecting legs or struts, e.g. extending from the outside of the piston body. The piston body is closed, e.g. as a plate or disc, except for any process fluid inlet through it, whereas the contact structure or support body for it may be an open ring. The back (outer side) of the piston body may be exposed through the contact structure, so a connector or union comprised in or fixed to the piston body, for a fluid conduit, may be exposed and operable on the outer side of the piston body. The same may be true of one or more other connectors, e.g. for actuation of dynamic elements as discussed below.

The degree of axial spacing needed between the tilt-preventing contact structure (or the axially-extreme part thereof) and the operating seal will depend on the dimensions of the column, the piston and on the structure at the operating seal. Axial alignment needs to be maintained sufficiently to maintain the seal and to prevent jamming of the piston. This may take into account the extent to which the operating seal projects relative to its surrounding mounting, which may be of a hard material e.g. metal which to avoid damage should not contact the tube interior especially if the latter is of plastics material. Typically the axial extent (the maximum distance reached by the contact structure away from the operating seal axial position) is at least 20%, at least 25% or at least 30% of the diameter of the piston (or of the corresponding internal diameter of the column tube).

The operating seal of the piston body may be of any suitable kind, for example an elastomer ring (single or multiple). The piston body may have a peripheral groove or channel in which it is mounted or housed. A mechanism or means may be provided for advancing or retracting the operating seal radially, e.g. to urge it outwardly against the tube interior to enhance the seal at a selected position, and/or to retract it to loosen or release the seal and facilitate or allow movement of the piston along the tube, or the passage of liquid around it e.g. for cleaning. A pneumatic mechanism is preferred for this radial drive or actuation of the seal, being easily actuated from outside the column tube. A pneumatic gas line for this purpose may connect to the piston body and extend through an interior gas space which when pressurised expands the operating seal. Depending on the structure, material and dimensions of the seal either of the retraction or the expansion movement/urge may be under elastic recovery or under forced actuation by a mechanism as mentioned. The seal may be radially retractable sufficiently to form an annular clearance between the seal and the column tube wall. For process purposes, this clearance is desirably larger than the largest media particles used in the column. When engaged with the tube wall, e.g. under radially outward actuation as proposed, the operating seal may function to grip the tube to hold the piston in position e.g. against its own weight and/or against positive fluid pressure from above or below. Or, the contact structure or a combination of the contact structure and seal may serve this function.

The piston body desirably has a central opening as (or for) the process fluid/mobile phase conduit. This opening may receive or form a union or connector, for connecting to a flexible process fluid/mobile phase conduit outside the piston body. A conventional releasable liquid-tight connector such as a triclamp is suitable. Preferably the inner face of the piston body, directed onto to the operating volume, is convergent towards the conduit entrance, to facilitate smooth flow and escape of liquid and gas through the opening. If it is an expanded bed apparatus, this inner face may be directly exposed to the operating volume. If it is a packed bed, there may be an overlying mesh layer to prevent the passage of particles. The form of a converging inner surface may be conical or dished. If conical, the cone angle relative to the radial plane is preferably between 4° and 25°.

The materials used for the piston and tilt-prevention structure thereof will depend on the size of the apparatus and the chosen structure, but typically metal and/or engineering plastic materials are suitable. The piston is preferred not to be a buoyant or floatable component. Steel is generally good, but heavy and expensive. Engineering plastics such as PEEK are very good but expensive. Large shaped components subject to primarily general pressures and stresses, such as a piston body, may be made from standard plastics such as polypropylene which are much cheaper, easier to form and have adequate strength.

A second proposal concerning the moveable piston, which may have any of the features proposed above in the first proposal, is apparatus and methods providing for the use of pressurised gas in a pneumatic space behind (outside) the movable piston to control the piston's position, i.e. to hold or change its axial position in the column tube. For this purpose, apparatus has a gas-tight pneumatic space defined outside the movable piston, preferably by the column tube and an outer closure (e.g. an end plate) thereof. Means are provided for supplying pressurised gas into this pneumatic space to act on the movable piston, e.g. directly on the outer surface of the piston body of a self-aligning piston as described in the first proposal above. A gas supply line may connect into the pneumatic space through the column tube wall or, more preferably, through an end plate constituting the outer closure and which can be removed from the column tube. A gas supply is connected to the gas supply line. A gas pressure control for the gas supply line can be provided, preferably as part of the apparatus (i.e. as distinct from a control on the supply itself), and desirably provide both a shut-off condition and a range of maintainable operating pressures. The operating pressures need not be high for most processes, e.g. in a range of 0 to 5 bar (gauge pressure). However higher pressures e.g. up to 10 barg may be used if supported by the apparatus. The gas supply may be sterile or via a sterilising filter in the supply line, enabling sterile conditions in the space outside the piston during operation.

Usually, at various stages of a chromatography process, the operating volume is at raised pressure and this must be contained by the end cells (i.e. retaining structures or closures). Where a movable piston provides an end cell, the structure and material of the piston and the means by which the piston is held and moved must all be able to withstand this bed pressure or operating fluid pressure, which for large columns means heavy and awkward components. By applying pneumatic pressure on the outside of a movable piston to counter-balance all or part of the liquid pressure on the other side, the strength demands on the piston are reduced and it can be made lighter and easier to handle.

Thus it can be arranged that the piston and its components (including the operating seal) may need to withstand only the difference between the pressures in the pneumatic space and the operating volume, both of which pressures are controllable, together with any frictional resistance during position change, the weight of the piston itself and the structural forces involved in alignment via the contact structure and in urging the seal and contact structure out against the tube wall. The difference in pressures is usually/typically less than 0.5 bar, and may be controlled or controllable to such low differential pressures, e.g. less than 0.5 bar in an EBA process. The general balancing of axial forces also facilitates the radial actions/movements of the piston with operating seal and contact structure.

Where the piston engages the piston wall by means of an inflatable element e.g. a seal, and the column interior is pressurised, it is necessary to provide adequate excess inflation pressure to enable the inflatable element to expand against the surrounding pressure in the column.

The fluid pressure in the operating volume may be sufficient to move the movable piston outwardly (usually upwardly). So, both inward and outward piston movements may be available by adjustment of the gas pressure (e.g. air pressure) in the pneumatic space, without necessarily needing to adjust the liquid flow pressure in the operating volume as well, although of course that is also a possibility but usually the process fluid flow is adjusted primarily or only with the bed behaviour in mind. In some other kinds of chromatography processes the piston may be allowed to move to accommodate volume changes of a packed media bed, e.g. swelling or shrinking of the medium as the ionic composition of the surrounding liquid changes.

One particular desirable context for such apparatus and procedures is expanded bed or fluidised bed chromatography, in which the movable piston is the top cell of an upright column. A central process fluid outlet of the movable piston may connect to the exterior of the column via a flexible conduit e.g. a polymeric hose, which may extend through the pneumatic space and through the column tube (or an end closure thereof) via a sealed isolated connector to maintain the gas-tight condition of the space. The flexible conduit can flex or contract/extend to accommodate the necessary operational range of axial movement of the piston and so that it can fit in the pneumatic chamber at less than full extension.

An expanded bed or fluidized bed chromatography process, or separation or purification process, in which the height of the movable piston is adjusted by controlling gas pressure in the pneumatic space, is an aspect of the present proposal. Most preferably it uses a self-aligning piston as described in the first aspect above. Thus, unlike the proposal in U.S. Pat. No. 5,366,621 to use gas pressure behind a piston to help move the piston, this proposal would then not involve rigid piston support structures extending out through the end of the column. The piston can therefore be both lighter in weight and vertically compact, and correspondingly better suited for scaling-up. Thus, while column dimensions are not especially critical for operational effectiveness, we envisage greatest benefit in application of our proposals in larger preparative-scale apparatus e.g. column diameters of at least 100 mm, or at least 200 mm, or preferably at least 300 mm for expanded fluidised bed apparatus and processes, or at least 750 mm or at least 1000 mm in diameter for packed bed apparatus and processes (including ion-exchange) which may be as large as e.g. 4 m diameter, although these too may be smaller e.g. down to 300 or 100 mm diameter and still have advantages. Column height is important insofar as conventional larger columns have used long piston guides which, with a stand, greatly increased height e.g. so that a 1 m column tube has needed more than 2 m available operating height.

Nevertheless the principles described are also effective with smaller columns, e.g. laboratory-scale columns such as from 5 to 50 mm diameter, and columns less than 1 m long (high).

The column tube may be of any suitable material, e.g. conventional materials such as transparent plastics (e.g. acrylic) or metal e.g. steel. Transparent column tubes are preferred in some processes for visual monitoring. In expanded/fluidised bed apparatus a transparent tube is preferred.

In packed bed apparatus and processes, the need to move a top piston through large distances can be less than in expanded bed processes. However there will be a need for substantial movement, because the bed is usually packed from slurry filled into the column, and the distance moved by the piston to the packed condition will correspond to the dilution % of the slurry. With some packed processes (such as ion exchange) there may be significant expansion or contraction of the bed during processing. The pistons may be very large and cumbersome. The present proposals for the use of pneumatic pressure-balancing drive with a self-aligning piston are valuable, therefore. Conventional large columns with top pistons often use a set of hydraulic rams positioned around or above the column tube to support and move the piston. These are bulky structures, and control of the rams so that they act together to slide the piston without tilting and jamming is difficult and requires sophisticated apparatus. By deploying gas pressure in an enclosed pneumatic space behind the piston, as proposed herein, the piston can be made lighter in structure and more easily handleable and controllable. A set of hydraulic rams can be omitted.

A third aspect of our proposals relating to movable pistons is about the axial positioning and control of the movable piston in the column tube.

In combination with either or both of the previous proposals about the structure and control of the movable piston, we prefer that the apparatus comprises sensing means for detecting the axial position in the column tube of the movable piston and/or of features of a media particle bed or particle distribution (especially in the context of EBA in which there is usually a liquid-filled headspace or supernatant, which in turn may have a clear upper part and a cloudy/turbid lower part, between the top of the bed and the underside of the piston). Firstly, such sensing means may determine and may also indicate any operational position taken by the piston in the tube. Additionally or alternatively, a sensing means may comprise means for determining whether the axial position of the piston registers with one or more predetermined axial positions relative to the column, e.g. a predetermined lower position (perhaps corresponding to a packed bed state, e.g. for eluting an EBA column) and a predetermined upper position (e.g. corresponding to a predetermined adsorption stage position of an expanded bed column with the bed expanded, a stable expanded bed height position with a predetermined height of supernatant e.g. clear supernatant, or corresponding to a position for cleaning or servicing the apparatus). For that purpose, position-specific sensing means may be provided mounted at the side of the column tube at the corresponding positions, and able to detect the presence of the piston by any means appropriate to the nature of the piston and column tube wall, e.g. optically or by ultrasound.

Secondly, sensing means such as ultrasound may operate/be operable to detect position or condition of features of the medium particles, the bed thereof, or materials passing through or in the bed. Potentially useful detectable and/or measurable features include any one or more of the top of a bed (or expanded bed), the position of an interface between an expanded bed and clear supernatant, the height of a bed or expanded bed, the height of a supernatant liquid layer, the presence or height of a cloudy or turbid (low medium concentration) supernatant region or layer, the presence/position of an interface between cloudy and clear supernatant regions, the presence/position of an interface between a cloudy supernatant region and an expanded bad regions. The packed, expanded, stable or unstable conditions of a bed, regions of clear supernatant, cloudy regions or regions of lower medium concentration may be detected, e.g. using density-dependent detection such as ultrasound. Concentrations or concentration variations of other (non-medium) substances in the bed may also be detected, such as solutes of interest e.g. target molecules, or non-medium particles.

In relation to the apparatus and process proposals above for driving the movement of the piston, preferably by pneumatic means, the apparatus may comprise and the process may use a control system to control the gas pressure in the pneumatic space (to adjust, change or maintain the axial position of the piston) in dependence on signals received from the position/condition-sensing means, which in turn depend on the position of the piston or on the position or condition of or in the particle bed or of the top of the bed, or on the detection of media particles or other particles or substances in general. This control system may enable or provide automated control of the piston position or bed condition (although visual/manual intervention may be used instead or additionally) in dependence on column or process conditions (of any of the detectable kinds set out above) in real time, e.g. as a mode of Process Analytical Technology whereby process and product quality are designed, analysed or controlled with measurement of critical process parameters.

For monitoring such positions over a range, the apparatus may comprise a set or array of sensors or detectors distributed axially (usually vertically) on or at the side of the column tube and acting laterally (e.g. detection path in a radial plane). Additionally or alternatively the system may have a sensor acting axially (axially-extending detection path) which can measure the axial position of the piston e.g. as a distance relative to an end plate or end closure of the column.

Position-specific sensors may be e.g. ultrasound, optical, capacitive or inductive detectors (often with a combination of transmitter and receiver, preferably combined in a single transceiver) mounted on or adjacent the column tube wall, preferably with axial position adjustability relative to the column tube. A position-specific detector may include an indicator that any of the piston, bed front, media particles or clear liquid is present at the predetermined position, on the detection path. One or more supplementary detectors or sensors may be provided axially adjacent any mentioned predetermined position to indicate approach, overshoot or undershoot of the corresponding entity/condition to be detected (piston, bed front, liquid, media particles etc. as described above) relative to the predetermined position.

In preferred apparatus, desirably for expanded bed or fluidised bed columns but not limited to these, piston position detection is by means of an ultrasound transceiver mounted vertically adjustably, e.g. slidably, adjacent the tube wall, e.g. on a vertical support element of the apparatus, and securable at any of a range of axial positions. A set of such transceivers may be used to provide detection of adjacent positions as mentioned above, e.g. a set of at least two or at least three axially adjacent sensors.

Transceiver Mounting

An independent proposal herein is for the mounting of an ultrasound transmitter, receiver or transceiver. Ultrasound transducers generally need to make close contact at a suitable pressure against the surface of the tube to operate effectively. It is desirable, but difficult, to reach this condition by advancing the transducer gradually against the tube surface, to a controlled extent and pressure. To this end, we propose mounting an ultrasound transducer (e.g. a transceiver) on or in a pivoted mounting element adjacent to the column tube. The transducer face is to one side of the pivot. To the other side of the pivot, the mounting element carries a rotatable threaded adjuster element with an end positioned to bear against the column tube wall. The end that bears against the tube wall may be of a plastics material, if necessary, to avoid damage to the tube surface. Turning the adjuster with its end against the tube wall controllably and gradually pushes that end of the mounting element away from the tube wall, by threaded engagement with the mounting element, bringing the face of the ultrasound transducer correspondingly progressively towards and into operational contact with the tube wall. Desirably the pivot axis is vertical, e.g. provided on an upright structural element adjacent the column wall. This proposal enables rapid deployment of ultrasound sensing at newly-determined operating positions. For best results the axis of the threaded adjuster is preferably perpendicular to the tube wall, i.e. radial relative to the tube.

Flow Control

Another aspect herein (preferably combined with any one or more or all of the aspects above) is particularly concerned with expanded bed or fluidised bed processes, in which process liquid flows out of the column through a top outlet opening, preferably in a top end cell or top piston, but optionally in a free outlet conduit end that does not close off the column tube interior.

As mentioned above, the maintenance of a stable and effective expanded bed is challenging. One challenge is to avoid the formation of vortices in the liquid upflow. In the expanded bed apparatus and processes described herein, we prefer to use a process liquid inlet injection arrangement having an array of process liquid injection holes in a distribution rotor. These rotors have significant advantages, but their rotation naturally tends to initiate vortex formation in the bed volume. It is known to reverse the rotation direction from time to time to reduce this tendency, but it can still be a problem. Moreover, even without a rotational structure at the process liquid input, liquids have a tendency to form vortices where they flow out from a larger volume through a restricted conduit, such as from the bed volume out through the process liquid outlet of an expanded bed process.

Noting this, we have found that vortex formation can be usefully reduced by providing a vortex-inhibiting structure beneath the outlet opening, preferably as part of the outlet structure or as part of a piston or end cell structure which incorporates the outlet structure. The vortex-inhibiting structure comprises one or more divider, partition or slot-defining elements. These may be disposed in the opening and/or projecting down below the opening entrance, and/or projecting radially out beyond it. The one or more elements desirably extend(s) substantially radially, e.g. in radial planes, relative to the outlet axis. This structure divides the flow entering the outlet, and inhibits rotational movements around the outlet axis.

Preferably it comprises two or more upright radial vanes projecting downwardly and outwardly relative to the outlet opening, so as to reduce or inhibit rotational flow.

The structure may also comprise a downwardly-facing baffle, desirably at or below the level of the vanes or partitions, to promote approach of liquid to the outlet in a radially inward rather than axial direction.

Preferably the vortex-inhibiting structure for the outlet is incorporated in a fitting which is attached at or to the underside (inside face) of a movable top piston. Additionally or alternatively it or part of it (e.g. vanes) may be incorporated in the structure of the piston face. As mentioned, it may also be used in a column with a non-movable end cell, especially top cell, such as in a fixed wall or a non-moving or non-adjustable piston.

A preferred embodiment combines the above vortex inhibitor with a feature of a movable piston which is itself another new and independent proposal herein, namely a piston component or fitting with a lower extremity or structure which projects down axially below the periphery of the piston (which desirably has a dished or coned lower surface) to form a bump stop, so that if for any reason the piston should fall down inside the column, this (preferably central) lower extremity meets the structure at the bottom of the column first. The centre is typically a strong point, e.g. the hub of a rotary process liquid injection rotor, the outer parts of which would be vulnerable to damage if the piston fell on them. In the preferred embodiment the bump stop extremity and optionally also the vortex-inhibiting structure themselves are formed of polymeric or plastics materials to reduce the impact, and may be formed as a single unit e.g. in one piece. Preferably the extremity is downwardly convex to avoid trapping e.g. of air.

It is also a proposal herein to provide a vortex-inhibiting structure as described above at the inlet to the operating volume, such as at the bottom of a column tube. The options above are all applicable, but the other way up. Vortex-inhibiting structure may be provided at both ends.

Preferred Embodiments: Expanded Bed Adsorption Column

Drawing together the proposals above, preferred embodiments of our proposals are EBA columns and processes having a movable top piston, pneumatically-operable as discussed above, and preferably with sensor means for detecting or monitoring one or more positions of piston, liquid, bed front, particles, bed conditions or solute concentrations etc. as mentioned above, desirably also with feedback or dependency for the pneumatic actuation to control the piston in dependence on the position(s) or condition(s) detected by the sensor means. A top plate of the column may define the top of the pneumatic gas space. The process fluid exit conduit (piston exit conduit) is a flexible conduit or hose which may pass sealingly right through the top plate, or may connect to a fixed union in the top plate which connects the interior flexible conduit section with an exterior conduit section. One or more actuating lines, e.g. one or more pneumatic actuating lines, for any of dynamic operating seal(s) and/or piston tilt-preventing contact structure elements, may also pass sealingly through the top plate, or be connected through it via a fixed union. Since the top plate should make an airtight seal, it is preferred to leave it in place without disturbing its main peripheral seal. It may be for example bolted onto a top flange of the column tube. In this proposal and in the movable piston proposals in general it is preferred to provide a removable access hatch in the top plate so that routine operations such as cleaning (e.g. spraying in liquid) and visual inspection can be done without removing the top plate from the column tube. Thus, the hatch opening is desirably at least 50 mm, more preferably at least 100 mm across, e.g. a circular opening, so that e.g. a hand can pass through. The removable hatch cover makes a fluid-tight seal, desirably sealing out sideways with a sliding (plug) seal against the edge of the hatch opening.

At the bottom of the column, the apparatus preferably has a process liquid injection rotor with an array of injection holes, and a drive to rotate it. These are known, and a skilled person can choose a suitable one for the purpose in hand. Usually the bottom of the column is closed off by a fixed end plate, which may have a separate hole for the draining and optionally injection of the column contents (media particles). This can be a sanitary valved hole.

The underside of the top piston preferably has an anti-vortex structure as described above, which also preferably includes a lower bump stop extremity which is a lowermost part of the piston, so as to limit impact in case the piston falls.

Desirably the flexible outlet conduit is able to take the weight of the piston. Optionally a supplementary tether is provided, e.g. a wire whip check, that connects between the piston and the top plate to absorb initial energy should the piston fall, protecting the flexible conduit against shock loads. The flexible conduit may be made e.g. of wire-reinforced polymeric hose.

The column may be mounted on or connected to a mobile platform ("skid"), in a generally known way. A programmed control unit may be provided for operating the pneumatic drive, and may be integrated into the skid (programmable control platform).

The apparatus preferably comprises a gas filter to clean (sterilise) the gas, typically air, which is pumped into the pneumatic space above the piston.

Conventional or known media may be used for the EBA, according to the skilled person's knowledge. As is well known, preferred media particles for EBA are density-controlled, usually having a high-density core e.g. of quartz, tungsten carbide, zirconia or steel, and an active coat, e.g. of agarose gel, carrying selective binding groups for the target substance, e.g. Protein A for antibodies.

The apparatus and processes herein may be used for the production or purification of drugs, biopharmaceuticals, hormones, vaccines, or diagnostic agents, or biologically-produced precursors of these.

BRIEF DESCRIPTION OF THE DRAWINGS

Having described the general concepts proposed, we now describe examples with reference to the accompanying drawings in which:

FIG. 1 is an axial cross-section of an EBA column embodying the invention.

FIG. 2 is a plan view of the column, showing a line A-A for the section of FIG. 1.

FIG. 3 is a radial cross-section at B-B of FIG. 1.

DESCRIPTION OF THE SELECTED EMBODIMENTS

Figure 4:
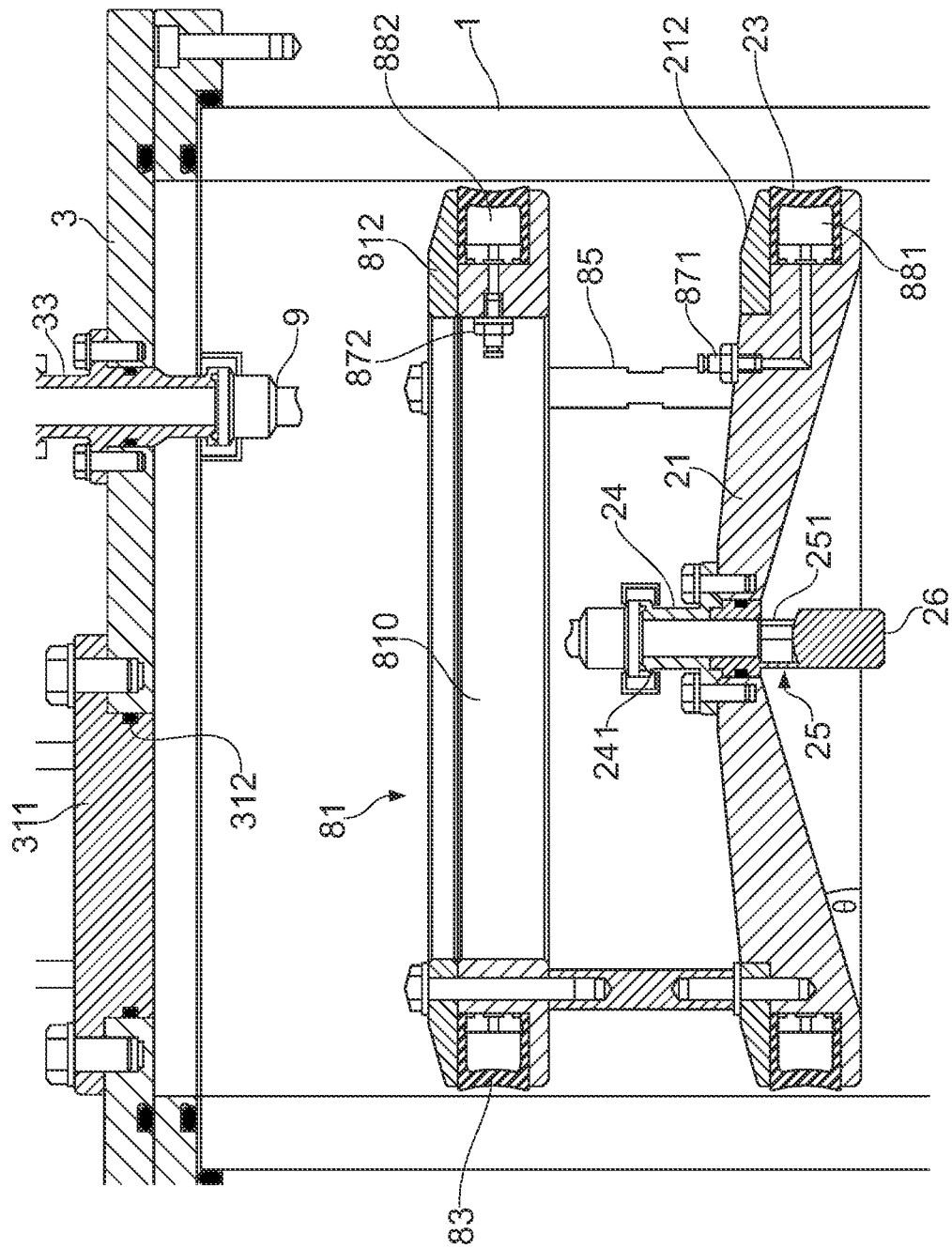
FIG. 4 is a radial cross-section showing details of the piston and top cover of the column.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

With reference to FIGS. 1 to 3, an expanded bed adsorption (EBA) apparatus comprises a vertical column tube 1 clamped between a top plate or cover 3 and a bottom plate 4 by a set of tie bars 11. In this embodiment the column tube 1 is of transparent polymer, e.g. acrylic. The column shown is 300 mm in internal diameter, 25 mm wall thickness. The tube may be e.g. from 1 to 2 m in height.

Figure 7:
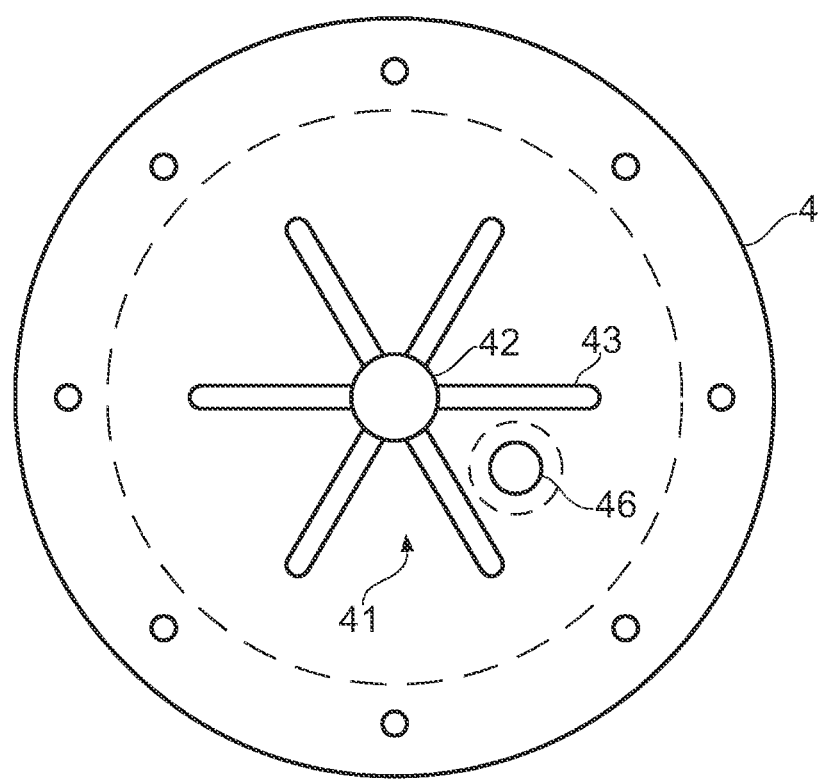
FIG. 7 is a plan view of a bottom plate with the column tube removed.

The bottom plate—see FIG. 7—carries a rotational process fluid input device 41, in the form of a circular rotor with radially-projecting arms 43 and a hub 42. Each arm has a series of downwardly-directed holes. The rotor 41 is drivable in rotation by a motor 44, and a process liquid inlet 45 is connected to feed process liquid up into the hub 42 of the rotor and along the arms 43, to be injected into the operating volume 13 of the column tube at positions distributed across the base plate 4. Rotors of this kind are known to the skilled person, and exist in various forms. In addition to feeding process liquid for separation, such as a cell broth homogenate, the rotor can be used to feed plain buffer for establishing a bed, or for washing media out of the column through a slurry inlet/drain hole 46 in the base plate 4. Preferably the drain hole 46 is also used as an inlet for feeding slurry of media particles into the column, being often preferable to loading the media from the top.

A self-aligning piston 2 operates in the column, dividing it into an operating volume 13 between the piston and base plate 4 and a pneumatic control space or chamber 77 between the piston 2 and top cover 3. The piston 2 consists of a closed circular piston plate 21 connected by an open upwardly-extending frame (in this case a set of four vertical struts 85) to a contact ring 81 which constitutes a stabilising or tilt-preventing part of the piston.

Figure 5:
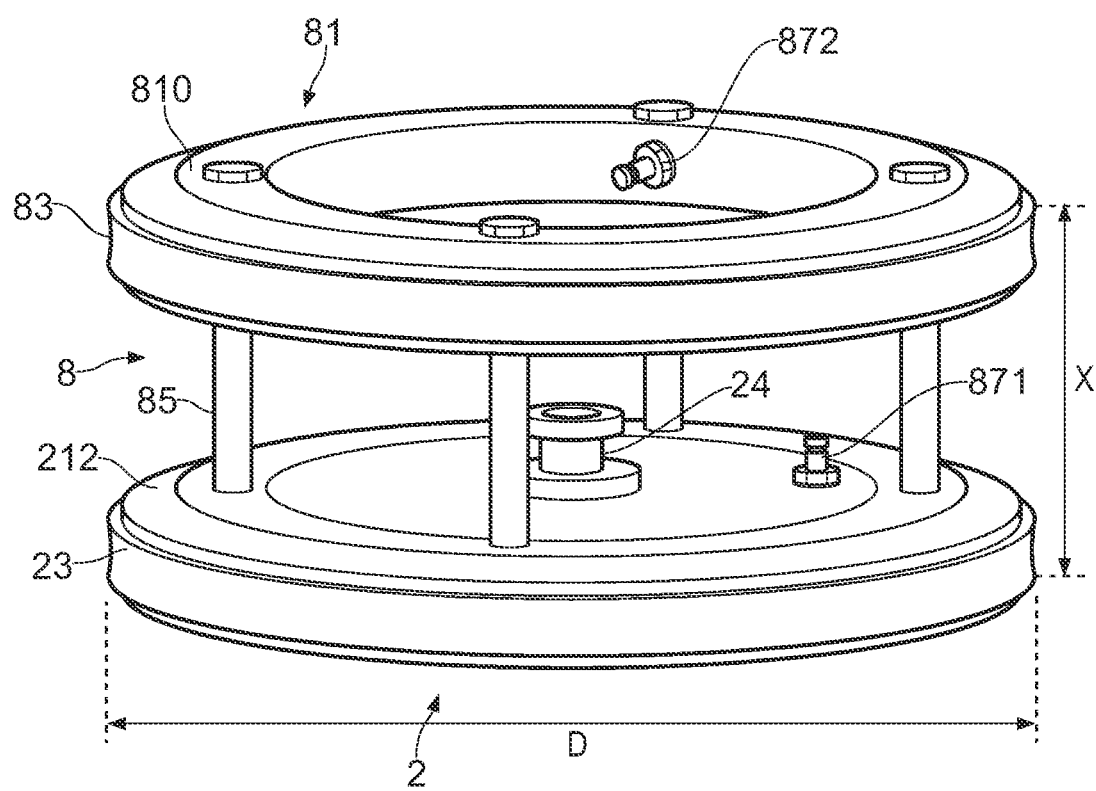
FIG. 5 is an oblique view of the piston separate from the column.

In more detail, with reference to FIGS. 4 and 5, the piston body or piston plate 21 carries a peripheral elastomeric sealing member 23, held in place by a clamping flange 212. In this embodiment the seal 23, whose function is to form a fluid-tight separation between the pneumatic space 77 and the operating volume 13, is a dynamic seal which can be energised with compressed air, by means of a compressed air line 71 connecting between a working space 881 defined inside the hollow seal member 23 via a connector 871 on the piston body 21. This air line 71 (see FIG. 1) passes in a sealed mode through the cover plate 3 and to a pressurised air control unit 6, connected in turn to a pressurised air supply 7. These are shown schematically in FIG. 1, and may use per se conventional technology. FIG. 4 shows the piston seal 23 in its non-energised condition, in which there is some clearance between seal and tube wall to enable cleaning. Desirably for this purpose the clearance is substantially larger than the largest diameter particles to be used in the process, so that particles can be reliably washed away from the sealing faces. When the pressurised air is fed to the seal's working space 881, e.g. at excess (gauge) pressure up to 6 bar, the seal is forced out against the column tube wall to make a fluid-tight seal and also prevent movement of the piston 2 up or down the tube. By reducing or relieving the pressure supply, e.g. to 2-3 barg, sliding of the piston may be allowed.

The piston 2 is not guided by any axial rod or tube extending out through the top of the column, unlike some known constructions. To preserve its axial alignment, i.e. to stop it from tilting as it moves, it comprises an inbuilt tilt-prevention structure in the form of a contact ring 81 which, by virtue of being axially spaced from the annular locus of the piston seal 23, contacting around the interior of the tube, prevents the piston from tilting. The axial spread or span of the piston seal and contact engagements ("X" in FIG. 5) is determined relative to the piston diameter ("D" in FIG. 5) so as to inhibit tilting sufficiently that the piston seal remains fully in contact with the tube wall, and hard piston material cannot contact the tube wall.

In this version the stabilising contact ring 81 consists of a rigid steel support ring 810 carrying an inflatable annular elastomeric seal element 83, similar in structure and operation to the piston seal itself, which contacts the tube wall. However this contact seal 83 has no intrinsic sealing function, because the support ring 81 is open; its purpose is only to make an even and controllable contact around the tube interior. This contact can be controlled by the supply of pressurised gas along a stabiliser contact air line 72 connecting to the corresponding stabiliser seal working space 882 through a connector 872 on the support ring 810. Again, this air line 72 passes in a sealing manner through the cover plate 3 of the column and to the above-mentioned air control unit and air supply.

The piston 2 defines the top of the operating volume for the EBA process, including an outlet for the process liquid. The piston has a conically-recessed underside converging towards the central outlet. This embodiment cone has an angle of about 18°, and this steep angle helps escape of any air bubbles. At the centre, an outlet flow connector or union 24 is fixed through a central orifice of the piston plate 21, and has a top clamp fitting 241 e.g. a triclamp fitting for connection of a flexible outlet hose 9 above the piston. With reference to FIGS. 1 and 4, the outlet hose 9 connects at its other end to a fixed connector or union 33 (triclamp to triclamp through the top plate) communicating in a sealing fashion through the cover plate 3 to an external outlet conduit. The outlet hose 9, desirably of wire-reinforced silicone tubing, is flexible to accommodate movement of the piston 2 up and down inside the column tube 1, strong enough to support the weight of the piston, and short enough to hold the piston off the bottom plate.

On the underside of the outlet connector 24 a vortex-inhibitor device 25 is fitted, in this case by screws on a flange which is part of the anti-vortex device, which passes down (FIG. 4) through the piston and is stopped by the flange, having holes for bolts screwing into the piston body 21 (stainless steel). The vortex inhibitor in this embodiment comprises a unit with a set of three flat radial vanes at 120° to one another and meeting along the axis. These inhibit rotational flow (vortex formation) as liquid leaves the operating volume 13 through the outlet and into the conduit 9. This inhibition of rotational flow at the outlet helps to prevent undesired disruption of the media bed in the region adjacent the outlet. Additionally, approach to the outlet from directly beneath is blocked by a baffle portion 26 of the vortex-inhibiting fitting 25, so that liquid approaches primarily radially rather than axially. In this embodiment the baffle portion is extended to form a nose or bump stop 26 which projects axially below the piston body. The bump stop/vortex-inhibitor fitting is made of a single piece of engineering plastics, such as PEEK. Should the piston 2 by accident be dropped down the column with the sealing rings 23,83 released and the hose 9 not in place to stop it, the bump stop 26 will strike the central hub of the input rotor at the bottom (or other strong central structure, according to the design) avoiding damage caused by the peripheral sealing parts of the piston hitting the bottom plate or rotor.

In this embodiment the top stabilising contact ring 83 can be pressurised in the same way and to the same pressure as the sealing ring 23 proper. However this is just one option. It is also possible to use ordinary elastomeric seals, without pneumatic actuation. Or, different mechanisms may be provided, actuated either pneumatically or by other means, for urging the seals or contact structures either out against the tube wall, or in away from the tube wall to allow movement of the piston and/or passage of cleaning liquid. One suitable construction uses an inflatable seal for the piston seal 23 and a simple elastomer ring for the top contact, so that some frictional restraint is always imposed on movement of the piston 2.

The illustrated piston is based on a primarily steel structure apart from the vortex-controlling outlet, but the skilled person will appreciate that other material types may advantageously be used as discussed earlier.

A pneumatic space 77 is defined above the piston, the outlet hose 9 and any energising air lines 71,72 for the piston components extending in isolated fashion through the pneumatic space 77. The pneumatic space 77 is connected also to a pressurised air supply via the air chamber air line 73, also connecting to the air supply 7 via the air control unit 6. By adjusting the air pressure supplied to line 73, the pressure in the air chamber 77 can be controlled to move the piston 2 up or down, or to maintain its position against changing pressures beneath from the up-flowing process liquid in the operating volume 13. In practice we find that this can readily be achieved with air gauge pressures less than 3 bar against seal pressures of 2-3 bar. The air line 73 may optionally incorporate an air filter, such as a submicron disposable filter, enabling the pneumatic space 77 to be kept sterile which is not possible in previous movable-piston EBA columns.

A circular access hatch 311,312 is provided in the top cover plate 3 so that routine operations such as cleaning (e.g. spraying in liquid) and visual inspection can be done without removing the top plate from the column tube. In this embodiment the hatch opening 312 is 100 mm diameter so that a hand can pass through. The removable (bolted) hatch cover 311 makes a fluid-tight seal, sealing out sideways with a sealing ring against the edge of the hatch opening 312. The construction shown has the air hose union 33 offset from the centre to maximise space for the hatch, but depending on overall dimensions it may be preferable to have the union central.

Figure 8:
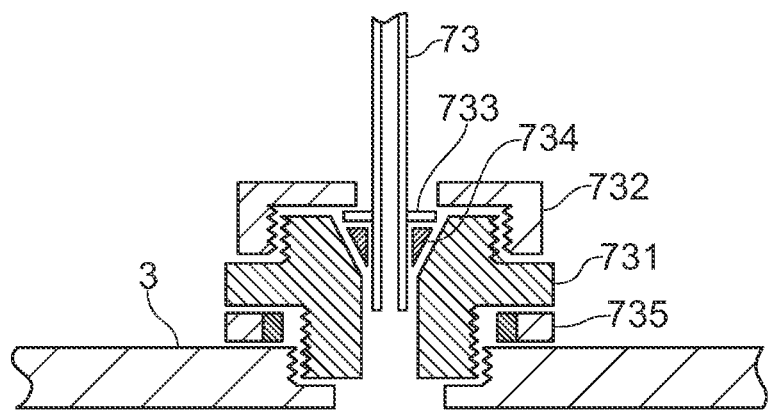
FIG. 8 is a fragmentary sectional view through the top cover showing sealed fitting of an air input to an air chamber.

FIG. 8 shows how the air chamber air line 73 may be connected fluid-tightly and securely into the cover plate 3, using a swaged connector of the "Swagelok" type, comprising a main fitting 731 that screws into a threaded bore in the plate 3 with a bottom shoulder, a metal-supported seal ("Dowty seal") beneath the flange of this, and a top swaging nut 732 to clamp the end of the air line 73 by means of an entrapment washer 733 and a tapered wedge washer 734 of soft material to seal against the air line tube 73. The air supply lines 71,72 to the piston may pass through similar fittings, except that because these air lines pass right through they have an identical sealing clamp on the underside too.

Figure 11:
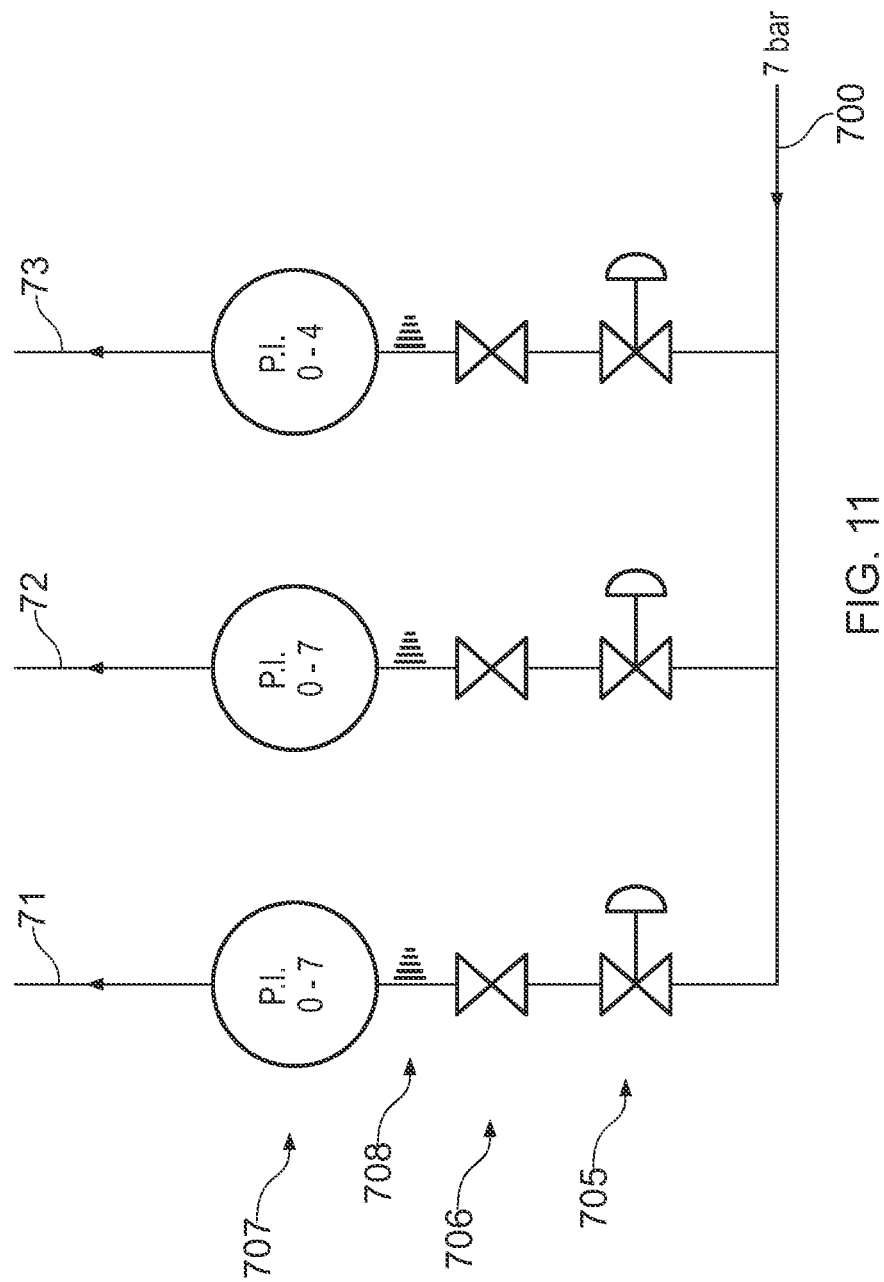
FIG. 11 is a schematic diagram showing more details of an air supply system.

FIG. 11 shows details of an air supply arrangement. In this arrangement air supply lines 71,72,73 for the top seal, bottom seal and pneumatic chamber are taken from a main supply line 700 e.g. from a 7 bar air cylinder. Each of the individual supply lines has, in sequence, a precision air regulator 705, a unidirectional valve 706 (e.g. a ball valve) to prevent back flow, a relief valve 708 for venting air in case of excessive pressurisation, and a pressure gauge 707. The regulator 705 for the pneumatic chamber line 73 provides for a smaller pressure range up to 4 bar whereas the inflatable seal lines 71,72 regulate up to 7 bar. The pneumatic chamber pressure acts on the outsides of the seals, so they need to be able to be pressurised to a higher pressure to guarantee the necessary outward mechanical force again the column wall.

Figure 6A:
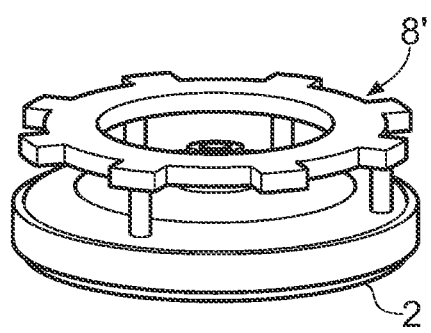
FIGS. 6(*a*) and 6(*b*) are oblique schematic views of piston designs showing conceptual alternatives for tilt-preventing structures.
Figure 6B:
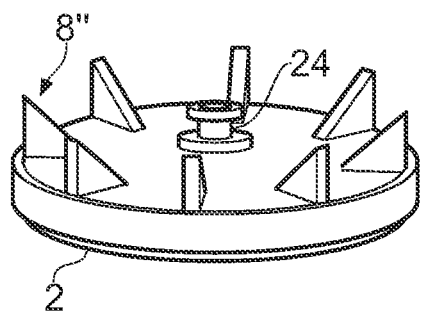

It will be understood that the stabilising function of the top ring 81 seen in FIG. 5 does not intrinsically require a seal. A variety of alternative structures may be used to provide adequate tilt-prevention, therefore. Some such structures are illustrated schematically in FIGS. 6(*a*) and 6(*b*). FIG. 6(*a*) shows a tilt-preventing structure supported through a frame as in the previous embodiment, but having a contact ring 8' which contacts the column tube interior intermittently at circumferentially-spaced positions, through a plurality of projecting slider contact portions. These might be of hard plastics. In FIG. 6(*b*), a similar effect is achieved by vertical fins 8" distributed around the top of the piston 2, and projecting high enough to stabilise it against tilting. The skilled person will readily conceive other possibilities, depending on the dimensions of the column, the type of piston seal and the materials to be used.

FIG. 1 shows the air control unit 6 only schematically. Generally it comprises for each air line 71,72,73 a respective shut-off valve, enabling the air chamber or seal components to be isolated while in a pressurised state, or opened to the pressure supply or to vent. It also incorporates respective pressure gauges to monitor the line pressures. It may have a manual-precision air regulator control for adjusting the individual line pressures. Most preferably it also provides for automated control in dependence on certain sensed conditions in the column tube, as indicated schematically in FIG. 1 by reference numeral 5 to indicate inputs from sensors which monitor conditions in the column at various positions.

Figure 9:
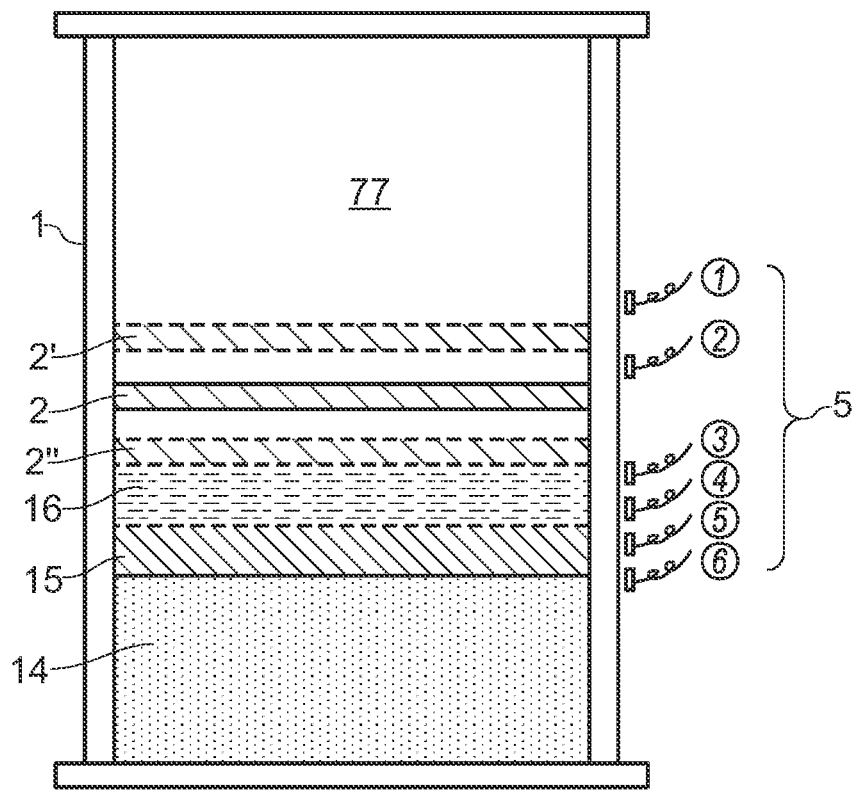
FIG. 9 is a schematic side view of the column indicating an array of sensors and elements of the column tube contents for EBA to be detected thereby.

To illustrate the possible roles and operation of sensors, see FIG. 9 which shows schematically the contents of the column tube 1. The piston 2 is shown at a primary position, also at alternative positions 2' and 2". FIG. 9 also shows characteristic conditions in the operating volume 13 during expanded bed operation, namely a bed region 14 consisting of the dense media particles, a top "headspace" of clear liquid immediately beneath the piston 2, and a turbid band or layer 15 between the headspace 16 and bed proper 14. This turbid layer contains fines from the mass of media. It is desirable to run the process with an appreciable headspace so that fines are not washed out of the operating volume 13 through the outlet. FIG. 9 also shows an array of six sensors 5, here numbered as 1 to 6, distributed down the wall of the column tube 1. These are desirably ultrasonic transceivers, which emit into the tube interior and detect characteristic echoes which differ according to whether they encounter empty space, the presence of the solid piston, headspace liquid, expanded bed 14, fine particles in the turbid region 15, raised solute concentration etc. The deployment of ultrasonic transceivers on vessels of this kind, and control circuitry for them, are known in themselves. However in this apparatus they are used in a distinctive way to facilitate control—either manual or automated—of the piston position, by means of adjusting the pressure in the pneumatic air space 77.

The skilled person will be able to conceive various modes in which the sensors can be used to control the piston position to achieve suitable EBA operating conditions.

In one possibility ("Aspect A") the sensors monitor the elements of the column bed. For example Sensor 1 monitors the headspace, Sensor 2 is positioned to align with the turbid band 15 in the correct operational position, Sensors 3 and 4 are to monitor the boundary between the turbid band 15 and the EBA bed proper 14, and Sensors 5 and 6 operate when the bed is allowed to settle (e.g. for elution of product), to monitor the top of the bed.

Another possible operational mode ("Aspect B") is as follows.

Sensors 1 and 2 define between them a range of appropriate positions for the piston 2. Initially, a piston may be positioned somewhat above the intended piston height during operation in expanded bed mode. Liquid on the column side, e.g. plain buffer, is flowed upwards to fill the lines and fill the column. By closing off a valve in the outlet conduit above the connector 33 (not shown) liquid pressure will rise in the operating volume 13 and push the piston up, starting to compress air in the air chamber 77. When the piston 2 reaches Sensor 2, Sensor 2 sends a signal and the air control unit 6 responds by initialising a routine to stop further piston movement, by e.g. pressurising the inflatable seals 23,83 to stop the piston, by opening the process liquid valve to allow process liquid to flow out again, by increasing air supply into the top chamber 77 to give the desired pressure differential between the air above and the liquid below the piston, or by some combination of these steps. This can maintain the piston in the desired operating height zone without passing Sensor 1 (which, if actuated, indicates a problem and may automatically trigger a halt in process liquid flow).

In Aspect B, Sensors 3 and 4 can monitor the position of the interface between the clear supernatant 16 and the turbid zone 15, to ensure that the fines in the turbid zone do not leave the column and foul downstream equipment. In combination with the pressurised air control unit 6 and suitable operating software or program control, they can prevent the piston being pushed down into the turbid region. Sensors 5 and 6 can indicate a position for the top of the particle bed 14 and define desired tolerances for the bed height: if Sensor 6 detects the boundary, the air chamber pressure can be dropped or the liquid pressure increased to move the piston up. It stops when Sensor 5 detects the boundary. Conversely, if the piston were too high, Sensor 5 would fire and the opposite routine would operate. The piston can then be maintained between Sensors 5 and 6.

A further possibility ("Aspect C") is to operate with three sensors above the piston (or the interface between the turbid zone and the clear headspace) and three below. In relation to the selected element (piston or interface) the three sensors in each direction could indicate degrees of deviation from a target position, e.g. Sensors 3 and 4 indicating respectively the upper and lower boundaries of the desired position band, Sensor 2 indicating "high" and Sensor 1 indicating "very high". Similarly for "low" and "very low" positions with Sensors 5 and 6. The control unit 6 can be programmed to initiate, for each detected position (fired sensor) an appropriate routine of events such as opening and closing valves, operating pumps, increasing or decreasing air pressure and the like to adjust the conditions on the column so the piston (or interface) remained in the target area.

Figure 10:
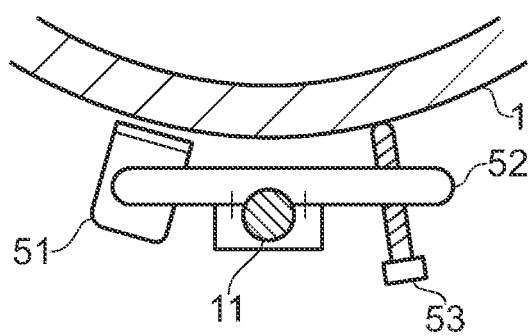
FIG. 10 is a fragmentary sectional view through a segment of tube wall showing a way of mounting an ultrasonic transceiver.

Finally, we show a way of mounting an ultrasonic transceiver 51 so that it can conveniently be brought into good operating contact with the surface of the tube wall 1. See FIG. 10. A horizontal elongate mounting member 52 is clamped so that it can pivot around one of the upright tie bars 11. The ultrasonic transceiver 51 is mounted at one end of the mounting member 52. At the other end a threaded adjuster 53 is provided, aligned substantially radially with the column tube. Desirably the adjuster 53 is of plastics material, so as not to scratch the tube. Clamping screws are provided (not shown) so that the transceiver mounting 52 can be positioned and held at any desired position up or down the tie bar 11. Further sensors may be positioned on the same or other tie bars. A visual length scale may be provided as well, to facilitate positioning. When the threaded fastener 53 is tightened through the corresponding threaded hole in the mounting member 52, by a lever effect the face of the transceiver 51 is brought gradually into contact with the outside surface of the tube wall 1. By this means the transceivers can easily be brought into an appropriate pressure contact against the tube surface, which is important for effective operation. The transceiver device likewise is then radially-oriented relative to the tube.

Figure 12:
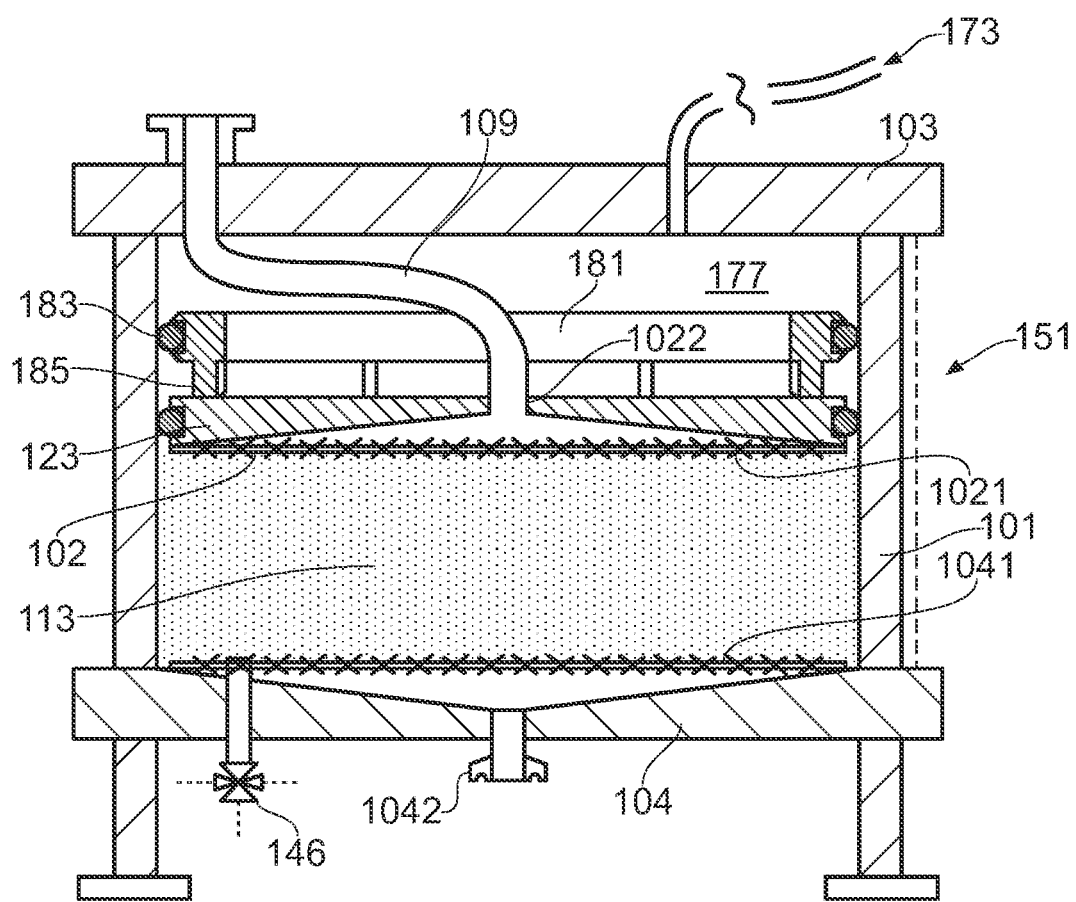
FIG. 12 shows schematically a column of packed-bed type with a movable piston according to our proposals.

FIG. 12 shows schematically the application of the present "balanced piston" concept in a packed bed column, in which the bottom end cell 104 (which may be a conventional packed-column design) and the top end cell incorporated in the present piston 102 are provided with media-retaining mesh layers 1041,1021 mounted over per se conventional convergent collection surfaces leading to and from process liquid conduits 1042,1022. To obviate the conventional support rods projecting up out of the top of the column in a conventional column, a top piston 102 embodying the present proposals is used and comprises a stabiliser ring 181 carrying a peripheral contact member 183 (formed here as a rubber seal ring, although without sealing function) spaced by an open frame 185 above the main piston seal to prevent it from tilting. A top cover plate 103 defines a pneumatic space 177 above the piston 102 to receive pressurised air or other gas via gas supply 173. An array of ultrasound sensors 151 is provided up the wall 101 of the column. These are useful to control the processes and/or the movement of the piston 102. They may be used to control the piston movement on detecting the correct position, or other parameters in the bed. If inflatable seals are used, as in the earlier embodiment, additional air inlets to supply these may be provided through the cover plate 103. In this embodiment a steel column wall 101 is envisaged. The column may be e.g. about 2 m in diameter.

Packing of the column and chromatographic processing may be by conventional methods. Slurry may be injected into the column bed space 113 through a central multi-functional packing valve of known type, or through a simple valve with slurry lines, communicating through the base and mesh as indicated at 146. The bed can then be packed by driving the piston down and this may be by pneumatic pressure rather than the conventional mechanical or hydraulic drives The present balanced piston in a packed bed column can avoid the presence of moving parts and complex mechanisms such as hydraulic or pneumatic drives extending above the envelope of the column. Being relatively mobile under controllable conditions, the top piston may easily be position-adjusted during use, e.g. to accommodate the swelling or shrinking of a packed bed according to changes in the ionic strength or nature of the buffer or other process liquid in which it is immersed.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A chromatography apparatus for expanded bed adsorption, comprising
a column tube, and top and bottom end cells which close off the column tube, defining between them an operating volume configured to contain a bed of adsorbent medium particles as stationary phase material;
first and second process liquid conduits communicating into the operating volume for liquid to enter and leave the operating volume, including a process liquid inlet injection arrangement, and a top outlet opening in the top end cell as a process liquid outlet, wherein the column tube is configured to flow a process liquid up through the bed of particles in an expanded state thereof,
characterised in that
an outlet structure at the top outlet opening includes a vortex-inhibiting structure beneath the top outlet opening, the vortex-inhibiting structure comprising one or more divider, partition or slot-defining elements to divide flow entering the outlet opening and inhibit rotational movements around an outlet axis.

2. The chromatography apparatus of claim 1 wherein said one or more elements of the vortex-inhibiting structure are disposed in the outlet opening and/or projecting down below the entrance of the outlet opening.

3. The chromatography apparatus of claim 1 wherein said one or more elements of the vortex-inhibiting structure project radially out beyond the entrance of the outlet opening.

4. The chromatography apparatus of claim 1 wherein said one or more elements of the vortex-inhibiting structure extend substantially radially, e.g. in radial planes, relative to the outlet axis.

5. The chromatography apparatus of claim 4 wherein said one or more elements of the vortex-inhibiting structure extend in radial planes relative to the outlet axis.

6. The chromatography apparatus of claim 1 wherein said vortex-inhibiting structure comprises two or more upright radial vanes projecting downwardly and outwardly relative to the outlet opening so as to reduce or inhibit rotational flow.

7. The chromatography apparatus of claim 1 wherein said vortex-inhibiting structure also comprises a downwardly-facing baffle.

8. The chromatography apparatus of claim 7 wherein said downwardly-facing baffle is below the level of vanes or partitions comprised in said elements of the vortex-inhibiting structure.

9. The chromatography apparatus of claim 1 wherein said process liquid inlet injection arrangement comprises a distribution rotor with an array of process liquid injection holes.

10. The chromatography apparatus of claim 1 wherein said top end cell is a top piston slidably axially movable inside the column tube.

11. The chromatography apparatus of claim 10 wherein the top piston has an inner face directed onto and directly exposed to the operating volume, which inner face is convergent towards the entrance of the outlet opening.

12. The chromatography apparatus of claim 11 wherein the convergent inner face is conical and its cone angle relative to the radial plane is between 4° and 25°.

13. The chromatography apparatus of claim 10 wherein the vortex-inhibiting structure has a lower extremity which projects down axially below the periphery of the top piston.

* * * * *